US010358551B2

(12) United States Patent
Fantoni et al.

(10) Patent No.: US 10,358,551 B2
(45) Date of Patent: Jul. 23, 2019

(54) FLUOROELASTOMER COMPOSITION

(75) Inventors: Matteo Fantoni, Rho (IT); Marco Apostolo, Bellinzago (IT); Giovanni Comino, Monza (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 126 days.

(21) Appl. No.: 13/810,918

(22) PCT Filed: Jul. 14, 2011

(86) PCT No.: PCT/EP2011/062069
§ 371 (c)(1),
(2), (4) Date: Jan. 18, 2013

(87) PCT Pub. No.: WO2012/010495
PCT Pub. Date: Jan. 26, 2012

(65) Prior Publication Data
US 2013/0123412 A1 May 16, 2013

(30) Foreign Application Priority Data
Jul. 20, 2010 (EP) .................................... 10170189

(51) Int. Cl.
*C08K 7/00* (2006.01)
*C08K 9/02* (2006.01)
*C08L 27/12* (2006.01)
*C08L 29/10* (2006.01)

(52) U.S. Cl.
CPC ................ *C08L 29/10* (2013.01); *C08K 7/00* (2013.01); *C08K 9/02* (2013.01)

(58) Field of Classification Search
CPC ...................................................... C08L 29/10
See application file for complete search history.

(56) References Cited

U.S. PATENT DOCUMENTS 3,752,787 A 8/1973 De Brunner
3,876,654 A 4/1975 Pattison
3,933,732 A 1/1976 Schmiegel
4,035,565 A 7/1977 Apotheker et al.
4,233,421 A 11/1980 Worm
4,233,427 A 11/1980 Bargain et al.
4,243,770 A 1/1981 Tatemoto et al.
4,259,463 A 3/1981 Moggi et al.
4,281,092 A 7/1981 Breazeale
4,287,320 A 9/1981 Kolb
4,489,196 A 12/1984 Schmiegel
4,501,858 A 2/1985 Moggi
4,564,662 A 1/1986 Albin
4,694,045 A 9/1987 Moore
4,745,165 A 5/1988 Arcella et al.
4,748,208 A 5/1988 Kasahara et al.
4,943,622 A 7/1990 Naraki et al.
5,173,553 A 12/1992 Albano et al.
5,447,993 A 9/1995 Logothetis
5,591,804 A 1/1997 Coggio et al.
5,696,189 A 12/1997 Legare
5,716,553 A 2/1998 Bergmann et al.
5,767,204 A 6/1998 Iwa et al.
5,789,489 A 8/1998 Coughlin et al.
5,789,509 A 8/1998 Schmiegel
6,642,331 B2 * 11/2003 Apostolo et al. ............. 526/247
6,946,513 B2 * 9/2005 Higashino et al. ........... 524/544
7,737,035 B1 * 6/2010 Lind .................. C23C 16/4409
118/715
2001/0047048 A1 11/2001 Saito
2003/0125463 A1 7/2003 Tatsu et al.
2003/0236370 A1 12/2003 Grootaert et al.
2005/0107544 A1 5/2005 Wang
2005/0150172 A1 7/2005 Sato
2008/0038181 A1 * 2/2008 Alessio et al. ................ 423/430

FOREIGN PATENT DOCUMENTS

CN 101276895 A 10/2008
EP 0120462 A1 10/1984
EP 0136596 A2 4/1985
EP 0169304 A1 1/1986
EP 0182299 A2 5/1986
EP 0199138 A2 10/1986
EP 0222408 A2 5/1987
EP 0222409 A2 5/1987
EP 0335705 A1 10/1987
EP 0410351 A1 1/1991
EP 0661304 A1 7/1995
EP 0684276 A1 11/1995
EP 0684277 A1 11/1995
EP 0860436 A1 8/1998
EP 1262518 A2 12/2002
EP 1435402 A1 7/2004
EP 1591479 A1 11/2005
EP 1621519 A1 2/2006
EP 1728562 A1 12/2006
EP 1790460 A1 5/2007
GB 2010285 A 6/1979
JP 11236497 A 8/1999
JP 11256021 A 9/1999
JP 2000030543 A 1/2000
JP 2001139977 A 5/2001
JP 2003221888 A 8/2003
JP 2004051916 A 2/2004
JP 2004051917 A 2/2004
JP 2007162029 A 6/2007
WO WO 9705122 A1 2/1997
WO WO 9719983 A1 6/1997
WO WO 9837135 A1 8/1998
WO WO 0166652 A1 9/2001
WO WO 2009019209 A1 2/2009

* cited by examiner

*Primary Examiner* — Nicole M. Buie-Hatcher
(74) *Attorney, Agent, or Firm* — Osha Liang LLP

(57) ABSTRACT

A (per)fluoroelastomer composition having improved plasma resistance comprising at least one (per)fluoroelastomer [fluoroelastomer (A)] and from 0.1 to 50 weight parts per 100 parts by weight of said fluoroelastomer (A) of alkaline-earth metal carbonate particles [particles (P)]. Each particle comprises a core consisting essentially of at least one alkaline-earth metal carbonate and a shell consisting essentially of at least one Group IV transition metal compound.

18 Claims, No Drawings

FLUOROELASTOMER COMPOSITION

CROSS-REFERENCE TO RELATED APPLICATIONS

This application is a U.S. national stage entry under 35 U.S.C. § 371 of International Application No. PCT/EP2011/062069 filed Jul. 14, 2011, which claims priority to European application No. 10170189.4 filed Jul. 20, 2010, the whole content of this application being incorporated herein by reference for all purposes.

TECHNICAL FIELD

The invention pertains to certain fluoroelastomer compositions, in particular certain perfluoroelastomer compositions comprising particular inorganic fillers, and to their use for manufacturing shaped articles, which can advantageously withstand reactive plasma, corrosive gases and high temperature conditions.

BACKGROUND ART

Fluoroelastomers, and more particularly perfluoroelastomers, are currently used in a variety of applications in which severe environments are encountered, including high temperatures and aggressive chemicals.

Thanks to these top-end performances, these materials are routinely used notably in semi-conductors manufacturing devices as sealants or joints; these fluoroelastomer parts are thus routinely submitted to reactive plasma, corrosive cleaning fluids and high temperature. Under these extremely severe conditions, these materials might fail, leading to defects and loss of quality and productivity.

Solutions have thus been proposed for overcoming these limitations, including notably the adjunction to the fluoroelastomer composition of one or more inorganic additive.

Thus, WO 97/19983 (DU PONT) May 6, 1997 discloses perfluoroelastomer compositions which can be effectively used for manufacturing items able to sustain processing conditions encountered in dry process semiconductor manufacturing equipment; more particularly, this document discloses perfluoroelastomer compositions curable with peroxide or organo-tin metallic curative which are filled with a mixture of a metallic reinforcing filler chosen among $SiO_2$, $BaSO_4$, $Al_2O_3$ and aluminum silicate with a well-defined amount of $TiO_2$.

Nevertheless, the developments of electronic components manufacturing processes and of plasma etching techniques constantly raise the requirements for all manufacturing devices components, including those made from fluoroelastomers.

A remaining unmet need thus exists for fluoroelastomeric compositions processable to yield final parts able to satisfactorily withstand to the unusual process conditions found in advanced dry semiconductor manufacturing environment.

On the other side, Calcium, Magnesium and Barium-carbonate based fillers have been often proposed in the past as acid acceptors and/or basic compounds in ionically curable fluoroelastomer compositions (see for instance: EP 1591479 A (SOLVAY SOLEXIS SPA [IT]) 2 Nov. 2005) and in perfluoroelastomer compositions curable via peroxidic route (see e.g. EP 1262518 A (AUSIMONT SPA [IT]) 4 Dec. 2002).

Nevertheless, the compounds therein taught fail to provide acceptable plasma resistance for making them suitable for prolonged use in semiconductors manufacturing devices.

SUMMARY OF INVENTION

It is thus an object of the present invention a (per)fluoroelastomer composition comprising:

at least one (per)fluoroelastomer [fluoroelastomer (A)]; and from 0.1 to 50 weight parts, per 100 parts by weight of said fluoroelastomer (A) of alkaline-earth metal carbonate particles [particles (P)], each particle comprising:

(a) a core consisting essentially of at least one alkaline-earth metal carbonate; and (b) a shell consisting essentially of at least one Group IV transition metal compound.

The Applicant has surprisingly found that the adjunction of particles (P) in the (per)fluoroelastomer composition as above detailed enables achieving improved stability in plasma etching conditions, while also providing reinforcing effect, and thus improvement of tensile properties and hardness, making thus said composition perfectly suitable for manufacturing cured articles chemically compatible with the processes and equipments used during the fabrication of silicon wafers for the semiconductor industry.

For the purposes of this invention, the term "(per)fluoroelastomer" [fluoroelastomer (A)] is intended to designate a fluoropolymer resin serving as a base constituent for obtaining a true elastomer, said fluoropolymer resin comprising more than 10% wt, preferably more than 30% wt, of recurring units derived from at least one ethylenically unsaturated monomer comprising at least one fluorine atom (hereafter, (per)fluorinated monomer) and, optionally, recurring units derived from at least one ethylenically unsaturated monomer free from fluorine atom (hereafter, hydrogenated monomer).

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Non limitative examples of suitable (per)fluorinated monomers are notably:

$C_2$-$C_8$ fluoro- and/or perfluoroolefins, such as tetrafluoroethylene (TFE), hexafluoropropene (HFP), pentafluoropropylene, and hexafluoroisobutylene;

$C_2$-$C_8$ hydrogenated monofluoroolefins, such as vinyl fluoride; 1,2-difluoroethylene, vinylidene fluoride (VDF) and trifluoroethylene (TrFE);

(per)fluoroalkylethylenes complying with formula $CH_2$=CH—$R_{f0}$, in which $R_{f0}$ is a $C_1$-$C_6$ (per)fluoroalkyl or a $C_1$-$C_6$ (per)fluorooxyalkyl having one or more ether groups;

chloro- and/or bromo- and/or iodo-$C_2$-$C_6$ fluoroolefins, like chlorotrifluoroethylene (CTFE);

fluoroalkylvinylethers complying with formula $CF_2$=$CFOR_{f1}$ in which $R_{f1}$ is a $C_1$-$C_6$ fluoro- or perfluoroalkyl, e.g. —$CF_3$, —$C_2F_6$, —$C_3F_7$;

hydrofluoroalkylvinylethers complying with formula $CH_2$=$CFOR_{f1}$ in which $R_{f1}$ is a $C_1$-$C_6$ fluoro- or perfluoroalkyl, e.g. —$CF_3$, —$C_2F_5$, —$C_3F_7$;

fluoro-oxyalkylvinylethers complying with formula $CF_2$=$CFOX_0$, in which $X_0$ is a $C_1$-$C_{12}$ oxyalkyl, or a $C_1$-$C_{12}$ (per)fluorooxyalkyl having one or more ether groups, like perfluoro-2-propoxy-propyl;

fluoroalkyl-methoxy-vinylethers complying with formula $CF_2$=$CFOCF_2$ $OR_{f2}$ in which $R_{f2}$ is a $C_1$-$C_6$ fluoro- or perfluoroalkyl, e.g. —$CF_3$, —$C_2F_5$, —$C_3F_7$ or a $C_1$-$C_6$ (per)fluorooxyalkyl having one or more ether groups, like —$C_2F_5$—O—$CF_3$;

functional fluoro-alkylvinylethers complying with formula $CF_2$=$CFOY_0$, in which $Y_0$ is a $C_1$-$C_{12}$ alkyl or (per)fluoroalkyl, or a $C_1$-$C_{12}$ oxyalkyl or a $C_1$-$C_{12}$ (per)fluorooxyalkyl, said $Y_0$ group comprising a carboxylic or sulfonic acid group, in its acid, acid halide or salt form;

fluorodioxoles, of formula:

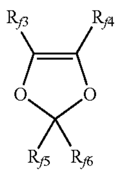

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom, e.g. —$CF_3$, —$C_2F_5$, —$C_3F_7$, —$OCF_3$, —$OCF_2CF_2OCF_3$.

Examples of hydrogenated monomers are notably hydrogenated alpha-olefins, including ethylene, propylene, 1-butene, diene monomers, styrene monomers, alpha-olefins being typically used.

Fluoroelastomers (A) are in general amorphous products or products having a low degree of crystallinity (crystalline phase less than 20% by volume) and a glass transition temperature ($T_g$) below room temperature. In most cases, the fluoroelastomer (A) has advantageously a $T_g$ below 10° C., preferably below 5° C., more preferably 0° C.

The fluoroelastomer (A) is preferably selected among:

(1) VDF-based copolymers, in which VDF is copolymerized with at least one comonomer chosen from the followings classes:

(a) $C_2$-$C_8$ perfluoroolefins, such as tetrafluoroethylene (TFE), hexafluoropropylene (HFP), hexafluoroisobutylene;

(b) hydrogen-containing $C_2$-$C_8$ olefins, such as vinyl fluoride (VF), trifluoroethylene (TrFE), perfluoroalkyl ethylenes of formula $CH_2$=CH—$R_f$, wherein $R_f$ is a $C_1$-$C_6$ perfluoroalkyl group;

(c) $C_2$-$C_8$ chloro and/or bromo and/or iodo-fluoroolefins such as chlorotrifluoroethylene (CTFE);

(d) (per)fluoroalkylvinylethers (PAVE) of formula $CF_2$=$CFOR_f$, wherein $R_f$ is a $C_1$-$C_6$ (per)fluoroalkyl group, e.g. $CF_3$, $C_2F_5$, $C_3F_7$;

(e) (per)fluoro-oxy-alkylvinylethers of formula $CF_2$=CFOX, wherein X is a $C_1$-$C_{12}$ ((per)fluoro)-oxyalkyl comprising catenary oxygen atoms, e.g. the perfluoro-2-propoxypropyl group;

(f) (per)fluorodioxoles having formula:

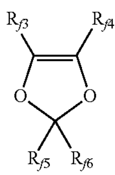

wherein $R_{f3}$, $R_{f4}$, $R_{f5}$, $R_{f6}$, equal or different from each other, are independently selected among fluorine atoms and $C_1$-$C_6$ (per)fluoroalkyl groups, optionally comprising one or more than one oxygen atom, such as notably —$CF_3$, —$C_2F_5$, —$C_3F_7$, —$OCF_3$, —$OCF_2CF_2OCF_3$; preferably, perfluorodioxoles;

(g) (per)fluoro-methoxy-vinylethers (MOVE, hereinafter) having formula:

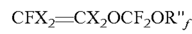

$$CFX_2{=}CX_2OCF_2OR''_f$$

wherein $R''_f$ is selected among $C_1$-$C_6$ (per)fluoroalkyls, linear or branched; $C_5$-$C_6$ cyclic (per)fluoroalkyls; and $C_2$-$C_6$ (per)fluorooxyalkyls, linear or branched, comprising from 1 to 3 catenary oxygen atoms, and $X_2$=F, H; preferably $X_2$ is F and $R''_f$ is —$CF_2CF_3$ (MOVE1); —$CF_2CF_2OCF_3$ (MOVE2); or —$CF_3$ (MOVE3);

(h) $C_2$-$C_8$ non-fluorinated olefins (OI), for example ethylene and propylene; and (2) TFE-based copolymers, in which TFE is copolymerized with at least one comonomer chosen from classes (c), (d), (e), (g), (h) as above detailed and the followings:

(i) perfluorovinyl ethers containing cyanide groups, such as notably those described in U.S. Pat. Nos. 4,281,092, 5,447,993 and 5,789,489.

Among above referred fluoroelastomers (A), TFE-based copolymers are preferred in particular when the same are used for producing parts of semiconductors manufacturing devices.

Optionally, fluoroelastomer (A) of the present invention also comprises recurring units derived from a bis-olefin [bis-olefin (OF)] having general formula:

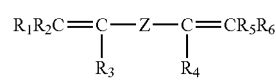

wherein $R_1$, $R_2$, $R_3$, $R_4$, $R_5$ and $R_6$, equal or different from each other, are H or $C_1$-$C_5$ alkyl; Z is a linear or branched $C_1$-$C_{18}$ alkylene or cycloalkylene radical, optionally containing oxygen atoms, preferably at least partially fluorinated, or a (per)fluoropolyoxyalkylene radical, e.g. as described in EP 661304 A (AUSIMONT SPA) 5 Jul. 1995.

The bis-olefin (OF) is preferably selected from the group consisting of those complying with formulae (OF-1), (OF-2) and (OF-3):

(OF-1)

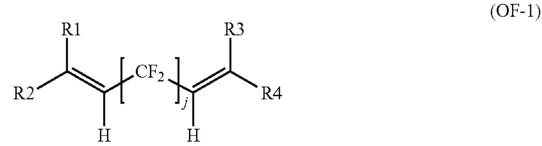

wherein j is an integer between 2 and 10, preferably between 4 and 8, and R1, R2, R3, R4, equal or different from each other, are H, F or $C_{1-5}$ alkyl or (per)fluoroalkyl group;

(OF-2)

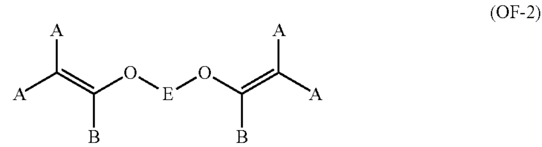

wherein each of A, equal or different from each other and at each occurrence, is independently selected from F, Cl, and H; each of B, equal or different from each other and at each occurrence, is independently selected from F, Cl, H and $OR_B$, wherein $R_B$ is a branched or straight chain alkyl radical which can be partially, substantially or completely fluorinated or chlorinated; E is a divalent group having 2 to 10 carbon atom, optionally fluorinated, which may be inserted with ether linkages; preferably E is a $—(CF_2)_m—$ group, with m being an integer from 3 to 5; a preferred bis-olefin of (OF-2) type is $F_2C{=}CF—O—(CF_2)_5—O—CF{=}CF_2$.

(OF-3)

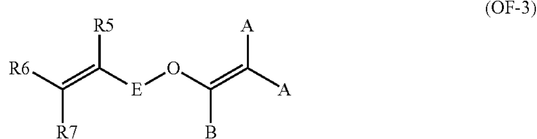

wherein E, A and B have the same meaning as above defined; R5, R6, R7, equal or different from each other, are H, F or $C_{1-5}$ alkyl or (per)fluoroalkyl group.

Among specific compositions of fluoroelastomers (A) suitable for the purpose of the invention, mention can be made of the following compositions (in mol %):

(i) vinylidene fluoride (VDF) 35-85%, hexafluoropropene (HFP) 10-45%, tetrafluoroethylene (TFE) 0-30%, perfluoroalkyl vinyl ethers (PAVE) 0-15%, bis-olefin (OF) 0-5%;

(ii) vinylidene fluoride (VDF) 50-80%, perfluoroalkyl vinyl ethers (PAVE) 5-50%, tetrafluoroethylene (TFE) 0-20%, bis-olefin (OF) 0-5%;

(iii) vinylidene fluoride (VDF) 20-30%, $C_2$-$C_8$ non-fluorinated olefins (OI) 10-30%, hexafluoropropene (HFP) and/or perfluoroalkyl vinyl ethers (PAVE) 18-27%, tetrafluoroethylene (TFE) 10-30%, bis-olefin (OF) 0-5%;

(iv) tetrafluoroethylene (TFE) 50-80%, perfluoroalkyl vinyl ethers (PAVE) 20-50%, bis-olefin (OF) 0-5%;

(v) tetrafluoroethylene (TFE) 45-65%, $C_2$-$C_8$ non-fluorinated olefins (OI) 20-55%, vinylidene fluoride 0-30%, bis-olefin (OF) 0-5%;

(vi) tetrafluoroethylene (TFE) 32-60% mol %, $C_2$-$C_8$ non-fluorinated olefins (OI) 10-40%, perfluoroalkyl vinyl ethers (PAVE) 20-40%, fluorovinyl ethers (MOVE) 0-30%, bis-olefin (OF) 0-5%;

(vii) tetrafluoroethylene (TFE) 33-75%, perfluoroalkyl vinyl ethers (PAVE) 15-45%, vinylidene fluoride (VDF) 5-30%, hexafluoropropene HFP 0-30%, bis-olefin (OF) 0-5%;

(viii) vinylidene fluoride (VDF) 35-85%, fluorovinyl ethers (MOVE) 5-40%, perfluoroalkyl vinyl ethers (PAVE) 0-30%, tetrafluoroethylene (TFE) 0-40%, hexafluoropropene (HFP) 0-30%, bis-olefin (OF) 0-5%;

(ix) tetrafluoroethylene (TFE) 20-70%, fluorovinyl ethers (MOVE) 30-80%, perfluoroalkyl vinyl ethers (PAVE) 0-50%, bis-olefin (OF) 0-5%.

The fluoroelastomer (A) can be prepared by any known method, such as emulsion or micro-emulsion polymerization, suspension or micro-suspension polymerization, bulk polymerization and solution polymerization.

Within the context of the present invention, the term "particle" possesses its conventional meaning, i.e. designates a discrete amount of solid substance having well defined three dimensional shape.

The core of the particle (P) has preferably an average diameter of at most 0.9 μm, 0.80 μm, most preferably of at most 0.75 μm, most preferably of at most 0.70 μm.

The term "average diameter of the core" is intended to denote the average value of the diameters of cross-sectional areas, associated to each of the possible differently oriented cross-sections of the cores of the alkaline-earth metal carbonate particles. The diameter of a cross-sectional area is defined as the diameter of the smallest circle which the cross-sectional area can be comprised in.

Average diameter of the core of the particles (P) may be preferably determined by SEM microscopy and image recognition on samples of the alkaline-earth metal carbonate particles.

Average diameter is calculated by measuring surface area of cores having maximal dimension within relevant values with respect to the total area of cores in the sample analyzed by SEM microscopy and image recognition. On such basis a weighted average is thus determined.

Advantageously, the particles (P) have an median particle size (D50) from 0.01 to 0.5 μm, preferably from 0.02 to 0.25 μm, more preferably from 0.03 to 0.1 μm.

The average particle size of the particles (P) of the invention can be measured by X-ray monitoring of gravity sedimentation according to ASTM B761-97.

Advantageously, the alkaline-earth metal carbonate particles have a specific surface area BET of 1 to 300 $m^2/g$, preferably of 5 to 250 $m^2/g$, more preferably from 10 to 180 $m^2/g$.

The specific surface area can be measured as per the Brunauer, Emmett and Teller (BET) method of calculation, according to ISO 9277, using nitrogen.

The shell consisting essentially of Group IV transition metal compound advantageously takes the form of a material disposed on the core, preferably completely surrounding (e.g., encapsulating) the core. Still, it is possible for production processes to result in particles (P) wherein the shell does not completely surround the core, but only partially covers the core, leaving a portion of the core exposed. These particles (P), if produced, will typically be present in relatively small amounts, typically less than 10% compared to core/shell particles where the shell does completely surround or encapsulate the core. It may also well be that the alkaline-earth metal carbonate particles according to the invention comprises a shell consisting of a Group IV transition metal compound, wherein part of said Group IV transition metal compound is a reaction product of the Group IV transition metal compound with the alkaline-earth metal carbonate at the surface of the particles.

The term "at least one alkaline-earth metal carbonate" is understood to mean that the core may consist essentially of one or more than one alkaline-earth carbonate.

Similarly, the term "at least one Group IV transition metal compound" is understood to mean that the shell may consist essentially of one or more than one Group IV transition metal compound.

The core and/or the shell of the powder of the invention may further comprise other cations and/or anions, moisture, additives and other ingredients which are used in the manufacturing process. Said components are generally present in reduced amount, typically as traces, and do not interfere with the properties and chemical behaviour of the particles of the invention.

The particles (P) preferably comprises a core consisting essentially of at least one carbonate chosen among the group consisting of magnesium carbonate, calcium carbonate, strontium carbonate, barium carbonate, and mixtures thereof. More preferably, it comprises a core consisting essentially of barium or strontium carbonate, or of a mixture thereof. Most preferably it comprises a core consisting essentially of barium carbonate.

The particles (P) advantageously comprise a shell consisting of at least one compound chosen among the group consisting of titanium compounds, zirconium compounds, hafnium compounds and mixtures thereof. More preferably it comprises a shell consisting essentially of at least one titanium compound.

The shell of the particles (P) generally consists of an inorganic compound of above mentioned Group IV transition metal; among said compounds, oxides, including mixed oxides, silicates, silico-aluminates, carbonates, sulphates. Among those Group IV transition metal inorganic compounds, oxides have been found to yield particularly good results.

Should the Group IV transition metal compound of the shell of particles (P) is a titanium compound, for further enhance resistance to plasma etching conditions, the shell comprises $TiO_2$, in amorphous and/or crystalline form, an at least partially crystalline form having been found to provide particularly good results.

The Group IV transition metal content in the alkaline-earth metal carbonate particles (P) is advantageously of at least 0.001, preferably of at least 0.01, more preferably of at least 0.1 mol per mol of alkaline-earth metal.

The Group IV transition metal content in the particles (P) is advantageously of at most 1.5, preferably of at most 1.05, more preferably of at most 1.03 mol per mol of alkaline-earth metal.

Advantageously, the Group IV transition metal content in the particles (P) is in the range of 0.001 to 1.05 mol per mol of alkaline-earth metal.

The particles (P) may further comprises at least one other layer of a third material which can be the same of different from the materials of the core and of the shell. For instance, the core may comprise a further coating consisting essentially of at least one alkaline-earth metal carbonate, either completely surrounding (e.g., encapsulating) or partially covering the particle (P). In addition or as an alternative, the particle (P) may be further coated with a suitable coating additive, such as a dispersing agent, a stabilizer, an antistatic agent and the like.

With the aim of maximizing stability in oxygen plasma environments, the (per)fluoroelastomer composition of the invention will not be added of elemental carbon compounds, such as carbon black, graphite or other carbonaceous materials, which can oxidize in reactive plasma environments. According to this embodiment, the (per)fluoroelastomer composition of the invention will be substantially free from said elemental carbon compounds.

The invention also pertains to the use of the (per)fluoroelastomer composition as above described for fabricating shaped articles.

The (per)fluoroelastomer composition can then be fabricated, e.g. by moulding (injection moulding, extrusion moulding), calendering, or extrusion, into the desired shaped article, which is advantageously subjected to vulcanization (curing) during the processing itself and/or in a subsequent step (post-treatment or post-cure), advantageously transforming the relatively soft, weak, (per)fluoroelastomer composition into a finished article made of non-tacky, strong, insoluble, chemically and thermally resistant cured (per) fluoroelastomer composition.

The invention finally pertains to cured articles obtained from the (per)fluoroelastomer compositions of the invention. Articles are notably obtained by means of ionic curing, peroxide curing and/or mixed curing from the (per)fluoroelastomer compositions of the invention.

As manufactured articles, O-rings, gaskets, pipes, fittings, shaft seals and oil seal rings can be mentioned.

Still an object of the invention is the use of said cured articles as components in semiconductors manufacturing devices, in particular their use in devices wherein said cured articles are exposed to plasma etching conditions.

When the (per)fluoroelastomer compositions of the present invention are cured by peroxide route, (per)fluoroelastomer preferably contains iodine and/or bromine atoms in the chain and/or at the end of the macromolecules. The introduction of these iodine and/or bromine atoms may be obtained:

- by addition during fluoroelastomer (A) manufacture into the polymerization medium of brominated and/or iodinated cure-site comonomers, such as bromo and/or iodo olefins containing from 2 to 10 carbon atoms (as described, for example, in U.S. Pat. Nos. 4,035,565 and 4,694,045), or iodo and/or bromo fluoroalkyl vinyl ethers (as described in U.S. Pat. Nos. 4,745,165, 4,564,662 and EP 199138 A), in amounts such that the content of cure-site comonomers in the fluoroelastomer (A) is generally between 0.05 and 2 mol per 100 mol of the other base monomer units; or
- via addition during fluoroelastomer (A) manufacture of iodinated and/or brominated chain-transfer agent(s) to the polymerization medium, for instance compounds of formula $R_f(I)_x(Br)_y$, in which $R_f$ is a (per)fluoroalkyl or a (per)fluorochloroalkyl containing from 1 to 8 carbon atoms, while x and y are integers between 0 and 2, with $1 \leq x+y \leq 2$ (see, for example, U.S. Pat. Nos. 4,243,770 and 4,943,622) or alkali metal or alkaline-earth metal iodides and/or bromides, as described in U.S. Pat. No. 5,173,553.

The peroxide curing is typically performed according to known techniques via addition of suitable peroxide that is capable of generating radicals by thermal decomposition. Among most commonly used agents, mention can be made of: dialkyl peroxides, for instance di-tert-butyl peroxide and 2,5-dimethyl-2,5-bis(tert-butylperoxy)hexane; dicumyl peroxide; dibenzoyl peroxide; di-tert-butyl perbenzoate; bis[1,3-dimethyl-3-(tert-butylperoxy)butyl] carbonate. Other suitable peroxide systems are those described, notably, in patent applications EP 136596 A and EP 410351 A.

Other ingredients generally added to the curable compound comprising the compositions of the invention, when curing via peroxidic route, are: (a) curing coagents, in amounts generally of between 0.5% and 10% and preferably between 1% and 7% by weight relative to the polymer; among these agents, the following are commonly used: triallyl cyanurate; triallyl isocyanurate (TAIC); tris(diallylamine)-s-triazine; triallyl phosphite; N,N-diallylacrylamide; N,N,N',N'-tetraallylmalonamide; trivinyl isocyanurate; 2,4,6-trivinyl methyltrisiloxane; bis-olefins (OF), as above detailed; triazines, such as notably those described in European patent applications EP 860436 A (AUSIMONT SPA) 26 Aug. 1998 and WO 97/05122 (DU PONT [US]) 13 Feb. 1997; among above mentioned curing coagents, bis-olefins (OF), as above detailed, and more specifically those of formula (OF-1), as above detailed, have been found to provide particularly good results;

(b) optionally, a metallic compound, in amounts of between 1% and 15% and preferably between 2% and 10% by weight relative to the weight of the polymer, chosen from oxides or hydroxides of divalent metals, for instance Mg, Zn, Ca or Pb, optionally combined with a salt of a weak acid, for instance Ba, Na, K, Pb, Ca stearates, benzoates, carbonates, oxalates or phosphites;

(c) optionally, acid acceptors of the metal non-oxide type, such as 1,8-bis(dimethylamino)naphthalene, octadecylamine, etc., as described in EP 708 797;

(d) optionally, other conventional additives, such as fillers, thickeners, pigments, antioxidants, stabilizers, processing aids, and the like.

When the fluoroelastomer (A) comprises recurring units comprising cyanide groups, the curing of the compositions thereof can be also performed using organotin compounds or biaromatic amine compounds as crosslinking agents, as notably described in U.S. Pat. Nos. 5,767,204 and 5,789,509. This type of curing may be combined with peroxide-type curing, when the fluoroelastomer (A) also comprises iodine or bromine atoms, preferably in terminal positions, e.g. as described in U.S. Pat. No. 5,447,993.

The ionic curing can be performed via addition of one or more curing agent and one or more accelerator, as well known in the art. The amounts of accelerator(s) are generally comprised between 0.05 and 5 phr and that of the curing agent typically between 0.5 and 15 phr and preferably between 1 and 6 phr.

Aromatic or aliphatic polyhydroxylated compounds, or derivatives thereof, may be used as curing agents; examples thereof are described, notably, in EP 335705 A and U.S. Pat. No. 4,233,427. Among these, mention will be made in particular of dihydroxy, trihydroxy and tetrahydroxy benzenes, naphthalenes or anthracenes; bisphenols, in which the two aromatic rings are linked together via an aliphatic, cycloaliphatic or aromatic divalent radical, or alternatively via an oxygen or sulphur atom, or else a carbonyl group. The aromatic rings may be substituted with one or more chlorine, fluorine or bromine atoms, or with carbonyl, alkyl or acyl groups. Bisphenol AF is particularly preferred.

Examples of accelerators that may be used include: quaternary ammonium or phosphonium salts (see, e.g., EP 335705 A and U.S. Pat. No. 3,876,654); aminophosphonium salts (see, e.g., U.S. Pat. No. 4,259,463); phosphoranes (see, e.g., U.S. Pat. No. 3,752,787); imine compounds of formula $[Ar_3 P—N{=}PAr_3]^{+n}X^{n-}$, with Ar being an aryl group, n=1 or 2 and X being a n-valent anion as described in EP 0120462 A (MONTEDISON SPA [IT]) 3 Oct. 1984 or of formula $[(R_3P)_2N]^{+}X^{-}$, with R being an aryl or an alkyl group, and X being a monovalent anion, e.g. as described in EP 0182299 A (ASAHI CHEMICAL IND [JP]) 28 May 1986; etc. Quaternary phosphonium salts and aminophosphonium salts are preferred.

Instead of using the accelerator and the curing agent separately, it is also possible to use an adduct between an accelerator and a curing agent in a mole ratio of from 1:2 to 1:5 and preferably from 1:3 to 1:5, the accelerator being one of the organic onium compounds having a positive charge, as defined above, and the curing agent being chosen from the compounds indicated above, in particular dihydroxy or polyhydroxy or dithiol or polythiol compounds; the adduct being obtained by melting the product of reaction between the accelerator and the curing agent in the indicated mole ratios, or by melting the mixture of the 1:1 adduct supplemented with the curing agent in the indicated amounts. Optionally, an excess of the accelerator, relative to that contained in the adduct, may also be present.

The following are particularly preferred as cations for the preparation of the adduct: 1,1-diphenyl-1-benzyl-N-diethyl-phosphoranamine and tetrabutylphosphonium; particularly preferred anions are bisphenol compounds in which the two aromatic rings are bonded via a divalent radical chosen from perfluoroalkyl groups of 3 to 7 carbon atoms, and the OH groups are in the para position. A method suitable for the preparation of an adduct as above described is described in European patent application EP 0684277 A (AUSIMONT SPA [IT]) 29 Nov. 1995, which is included herein in its entirety by reference.

Other ingredients generally added to the curable compound comprising the compositions of the invention, when curing via ionic route are:

i) one or more mineral acid acceptors chosen from those known in the ionic curing of vinylidene fluoride copolymers, typically comprised in amounts of 1-40 parts per 100 parts of fluoroelastomer (A);

ii) one or more basic compounds chosen from those known in the ionic curing of vinylidene fluoride copolymers, typically added in amounts of from 0.5 to 10 parts per 100 parts of fluoroelastomer (A).

The basic compounds mentioned in point ii) are commonly chosen from the group constituted by $Ca(OH)_2$, $Sr(OH)_2$, $Ba(OH)_2$, metal salts of weak acids, for instance Ca, Sr, Ba, Na and K carbonates, benzoates, oxalates and phosphites and mixtures of the abovementioned hydroxides with the above mentioned metal salts; among the compounds of the type i), mention may be made of MgO.

The above mentioned amounts of the mixture are relative to 100 phr of fluoroelastomer (A).

Also, other conventional additives, such as fillers, thickeners, pigments, antioxidants, stabilizers and the like, may then be added to the curing mixture.

The (per)fluoroelastomer compositions of the present invention may also be cured via a mixed route combining the two types of curing.

Should the disclosure of any of the patents, patent applications, and publications that are incorporated herein by reference conflict with the present description to the extent that it might render a term unclear, the present description shall take precedence.

The present invention will be now described in more detail with reference to the following examples, whose purpose is merely illustrative and not limitative of the scope of the invention.

EXAMPLES

Raw Materials

TECNOFLON® PFR 95HT TFE/MVE copolymer commercially available from Solvay Solexis S.p.A. has been used in all the examples.

$TiO_2$-Coated $BaCO_3$ having D90=1.84 μm; D50=0.98 μm, D10=0.30 μm and possessing a surface area of 165.9 $m^2/g$, commercially available from Solvay Bario e Derivati S.p.A. was used in the examples as representative of an alkaline-earth metal carbonate particles additive.

Comparative tests were carried out using Ti-pure® R-960 TiO2 commercially available from DuPont ($TiO_2$, herein after), or high purity barium carbonate VL600 grade, commercially available from Solvay Bario e Derivati S.p.A. ($BaCO_3$, hereinafter).

Sealing Property and Plasma Resistance Determination on Cured Samples

Perfluoroelastomer was pre-compounded with the additives and all ingredients in the table using an open roll mill. Plaques and O-rings (size class=214) have been cured in a pressed mould and then post-treated in an air circulating oven in conditions (time, temperature) specified in the Examples.

The compression set (C-SET) has been determined on O-ring (class: 214) or on 6 mm buttons, according to the ASTM D 395 method.

Plasma resistance was determined by exposing O-ring specimens to an $NF_3$ plasma in the following set of conditions:

TABLE 2

| | 3RD TRY | 4RD TRY |
|---|---|---|
| Flow of $NF_3$ | 35 sccm | 35 sccm |
| Pressure | 500 mTorr | 500 Torr |
| Power | 200 W | 150 W |
| Exposure | 1 h | 1 h |

and then, determining the weight loss occurred in the specimen as a consequence of this exposure. Lower is the weight loss, higher is the resistance of the sample towards erosion by plasma.

The examples hereby provided have demonstrated that the addition of the alkaline-earth metal carbonate particles to the fluoroelastomer (A) provides for enhanced resistance to plasma conditions, with reduced erosion, while still providing outstanding sealing and mechanical properties.

TABLE 1

| | | Run | | |
|---|---|---|---|---|
| | | 1 | 2C | 3C |
| Polymer - Compound | | | | |
| PFR 95HT | Wt | 100 | 100 | 100 |
| $TiO_2$-Coated $BaCO_3$ | parts | 10 | — | — |
| $TiO_2$ | | — | 20 | — |
| $BaCO_3$ | | — | — | 10 |
| Other ingredients | | | | |
| Bis-olefin(*) | Wt | 1.5 | 1.5 | 1.5 |
| Peroxide A(**) | parts | — | 1 | — |
| Peroxide B(***) | | 4 | Failed(°) | 4 |
| CSET - Compression set @200° C. | | | | |
| method | | ASTM D395 Method B | | |
| Specimen | | AS568A-214 | | |
| C-SET | % | 22 | 16 | 12 |
| CSET - Compression set @250° C. | | | | |
| C-SET Spec | | ASTM D395 Method B | | |
| Specimen | | AS568A-214 | | |
| C-SET | % | 34 | 46 | 28 |
| CSET - Compression set @300° C. | | | | |
| C-SET Spec | | ASTM D395 Method B | | |
| Specimen | | AS568A-214 | | |
| C-SET | % | 40 | 64 | 40 |
| CSET - Compression set @316° C. | | | | |
| C-SET Spec | | ASTM D395 Method B | | |
| Specimen | | AS568A-214 | | |
| C-SET | % | 57 | n.d. | 49 |
| Weight loss $NF_3$ plasma | | | | |
| 3RD TRY | % | 3.77 | 4.58 | 4.07 |
| 4RD TRY | % | 2.44 | 2.75 | 3.14 |

(*)bis-olefin of formula $CH_2{=}CH{-}(CF_2)_6{-}CH{=}CH_2$;

(**)A: Luperox 101 neat peroxide (2,5-bis(tert-butylperoxy)-2,5-dimethylhexane);

(***)B: Luperox 101 XL 45 supported peroxide (2,5-bis(tert-butylperoxy)-2,5-dimethylhexane).

(°)failed: O-rings were not able to pass the test @316° C.: specimens broke or were damaged at the end of compression period, so that no meaningful C-SET determination was possible.

The invention claimed is:

1. A (per)fluoroelastomer composition comprising:

at least one (per)fluoroelastomer [fluoroelastomer (A)]; and from 0.1 to 50 weight parts, per 100 parts by weight of said fluoroelastomer (A) of alkaline-earth metal carbonate particles [particles (P)], each said particle comprising:

(a) a core consisting essentially of at least one alkaline-earth metal carbonate; and (b) a shell consisting essentially of at least one Group IV transition metal compound.

2. The (per)fluoroelastomer composition of claim 1, wherein said fluoroelastomer (A) comprises recurring units derived from at least one (per)fluorinated monomer selected from the group consisting of:

$C_2$-$C_8$ fluoro- and/or perfluoroolefins;

$C_2$-$C_8$ hydrogenated monofluoroolefins;

(per)fluoroalkylethylenes complying with formula $CH_2{=}CH{-}R_{f0}$, wherein $R_{f0}$ is a $C_1$-$C_6$ (per)fluoroalkyl or a $C_1$-$C_6$ (per)fluorooxyalkyl having one or more ether groups;

chloro- and/or bromo- and/or iodo-$C_2$-$C_6$ fluoroolefins;

fluoroalkylvinylethers complying with formula $CF_2{=}CFOR_{f1}$ wherein $R_{f1}$ is a $C_1$-$C_6$ fluoro- or perfluoroalkyl;

hydrofluoroalkylvinylethers complying with formula $CH_2{=}CFOR_{f1}$ wherein $R_{f1}$ is a $C_1$-$C_6$ fluoro- or perfluoroalkyl;

fluoro-oxyalkylvinylethers complying with formula $CF_2{=}CFOX_0$, wherein $X_0$ is a $C_1$-$C_{12}$ oxyalkyl, or a $C_1$-$C_{12}$ (per)fluorooxyalkyl having one or more ether groups;

fluoroalkyl-methoxy-vinylethers complying with formula $CF_2{=}CFOCF_2OR_{f2}$ wherein $R_{f2}$ is a $C_1$-$C_6$ fluoro- or perfluoroalkyl or a $C_1$-$C_6$ (per)fluorooxyalkyl having one or more ether groups;

functional fluoro-alkylvinylethers complying with formula $CF_2{=}CFOY_0$, wherein $Y_0$ is a $C_1$-$C_{12}$ alkyl or (per)fluoroalkyl, or a $C_1$-$C_{12}$ oxyalkyl or a $C_1$-$C_{12}$ (per)fluorooxyalkyl, said $Y_0$ group comprising a carboxylic or sulfonic acid group, in its acid, acid halide or salt form;

fluorodioxoles, of formula:

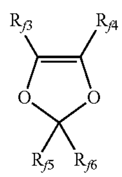

wherein each of $R_{f3}$, $R_{f4}$, $R_{f5}$, $R_{f6}$, equal or different each other, is independently selected from the group consisting of a fluorine atom, a $C_1$-$C_6$ fluoro- or per(halo)fluoroalkyl, optionally comprising one or more oxygen atom.

3. The (per)fluoroelastomer composition of claim 1, wherein (per)fluoroelastomer (A) is selected from the group consisting of:

(1) VDF-based copolymers, in which VDF is copolymerized with at least one comonomer selected from the group consisting of:

(a) $C_2$-$C_8$ perfluoroolefins;

(b) hydrogen-containing $C_2$-$C_8$ olefins;

(c) $C_2$-$C_8$ chloro and/or bromo and/or iodo-fluoroolefins;

(d) (per)fluoroalkylvinylethers (PAVE) of formula $CF_2{=}CFOR_f$, wherein $R_f$ is a $C_1$-$C_6$ (per)fluoroalkyl group;

(e) (per)fluoro-oxy-alkylvinylethers of formula $CF_2{=}CFOX$, wherein X is a $C_1$-$C_{12}$ ((per)fluoro)-oxyalkyl comprising catenary oxygen atoms;

(f) (per)fluorodioxoles having formula:

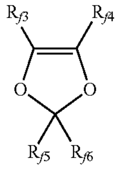

wherein $R_{f3}$, $R_{f4}$, $R_{f5}$, $R_{f6}$, equal or different from each other, are independently selected from the group consisting of fluorine atoms and $C_1$-$C_6$ (per)fluoroalkyl groups, optionally comprising one or more than one oxygen atom;

(g) (per)fluoro-methoxy-vinylethers (MOVE, hereinafter) having formula:

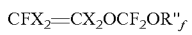

$CFX_2{=}CX_2OCF_2OR''_f$ wherein $R''_f$ is selected from the group consisting of $C_1$-$C_6$ (per)fluoroalkyls, linear or branched; $C_5$-$C_6$ cyclic (per) fluoroalkyls; and $C_2$-$C_6$ (per)fluorooxyalkyls, linear or branched, comprising from 1 to 3 catenary oxygen atoms, and $X_2{=}F$, H; and (h) $C_2$-$C_8$ non-fluorinated olefins (OI); and (2) TFE-based copolymers, wherein TFE 15 copolymerized with at least one comonomer selected from the group consisting of classes (c), (d), (e), (g), (h) as above detailed and:

(i) perfluorovinyl ethers containing cyanide groups.

4. The (per)fluoroelastomer composition of claim 1, wherein the fluoroelastomer (A) comprises recurring units derived from a bis-olefin [bis-olefin (OF)] having general formula:

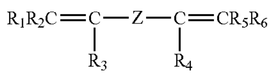

wherein $R_1$, $R_2$, $R_3$, $R_4$, $R_5$ and $R_6$, equal or different from each other, are H or $C_1$-$C_5$ alkyl; Z is a linear or branched $C_1$-$C_{18}$ alkylene or cycloalkylene radical, optionally containing oxygen atoms and optionally at least partially fluorinated, or a (per)fluoropolyoxyalkylene radical.

5. The (per)fluoroelastomer composition of claim 4, wherein said bis-olefin (OF) is selected from the group consisting of those complying with formulae (OF-1), (OF-2) and (OF-3):

(OF-1)

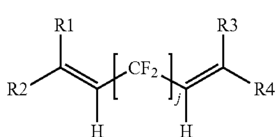

(OF-1)

wherein j is an integer between 2 and 10 and R1, R2, R3, R4, equal or different from each other, are H, F or $C_{1-5}$ alkyl or (per)fluoroalkyl group;

(OF-2)

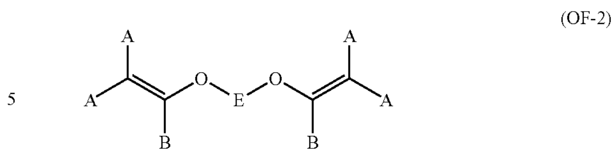

wherein each of A, equal or different from each other and at each occurrence, is independently selected from the group consisting of F, Cl, and H; each of B, equal or different from each other and at each occurrence, is independently selected from the group consisting of F, Cl, H and $OR_B$, wherein $R_B$ is a branched or straight chain alkyl radical which can be partially, substantially or completely fluorinated or chlorinated; E is a divalent group having 2 to 10 linkages;

(OF-3)

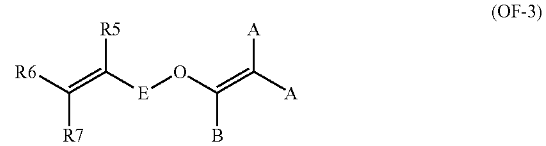

wherein E, A and B have the same meaning as above defined; R5, R6, R7, equal or different from each other, are H, F or $C_{1-5}$ alkyl or (per)fluoroalkyl group.

6. The (per)fluoroelastomer composition of claim 5, wherein j is an integer between 4 and 8.

7. The (per)fluoroelastomer composition of claim 5, wherein E is a $—(CF_2)_m—$ group and m is an integer from 3 to 5.

8. The (per)fluoroelastomer composition of claim 4, wherein Z is at least partially fluorinated.

9. The (per)fluoroelastomer composition of claim 1, wherein the particles (P) comprise a core consisting essentially of at least one carbonate selected from the group consisting of magnesium carbonate, calcium carbonate, strontium carbonate, barium carbonate, and mixtures thereof.

10. The (per)fluoroelastomer composition of claim 9, wherein the particles (P) comprise a core consisting essentially of barium carbonate.

11. The (per)fluoroelastomer composition of claim 1, wherein the particles (P) comprise a shell consisting of at least one compound selected from the group consisting of titanium compounds, zirconium compounds, hafnium compounds and mixtures thereof.

12. The (per)fluoroelastomer composition of claim 11, wherein the particles (P) comprise a shell consisting essentially of at least one titanium compound.

13. The (per)fluoroelastomer composition of claim 1, wherein the Group IV transition metal compound of the shell is a titanium compound, and wherein said shell comprises $TiO_2$, in amorphous and/or crystalline form.

14. The (per)fluoroelastomer composition of claim 13, wherein shell comprises $TiO_2$ in at least partially crystalline form.

15. A method for fabricating shaped articles, comprising moulding, calendering, or extruding the (per)fluoroelastomer composition of claim 1.

16. The method according to claim 15, further comprising vulcanizing the (per)fluoroelastomer composition, during the moulding, calendering, or extruding and/or in a subsequent step.

17. A cured article obtained by means of ionic curing, peroxide curing and/or mixed curing from the (per)fluoroelastomer composition of claim 1.

18. A semiconductor manufacturing device comprising the cured article of claim 17.

* * * * *